INVENTOR.
Harry Harp
BY Greek Wells
Atty.

July 10, 1956
H. HARP
2,753,675
COMBINE HAVING SIDE HILL PLATFORM
MOUNTING AND ADJUSTING MEANS
Filed March 24, 1952
5 Sheets-Sheet 2
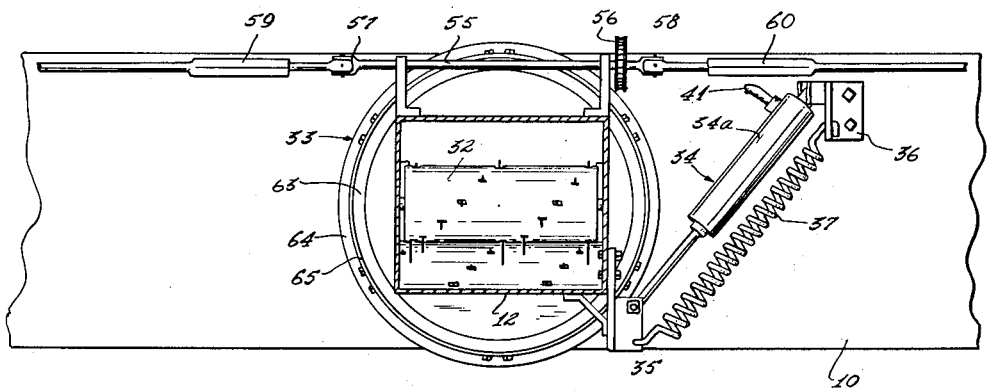
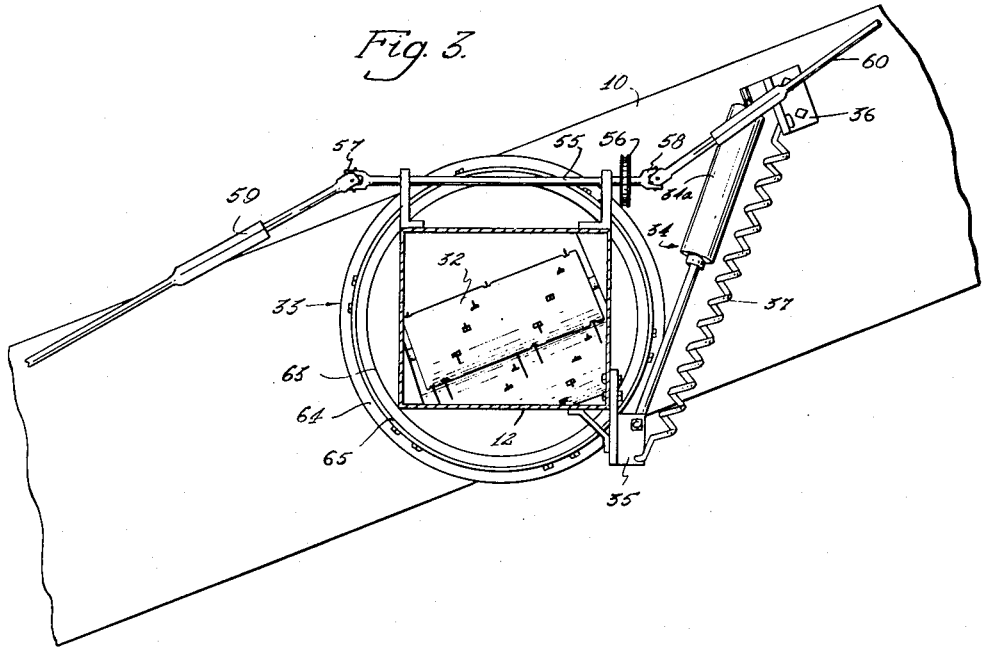
INVENTOR.
Harry Harp
BY
Greek Wells
Atty.

July 10, 1956

H. HARP 2,753,675

COMBINE HAVING SIDE HILL PLATFORM
MOUNTING AND ADJUSTING MEANS

Filed March 24, 1952

INVENTOR.
Harry Harp
BY
GrichWells
Atty.

July 10, 1956   H. HARP   2,753,675
COMBINE HAVING SIDE HILL PLATFORM
MOUNTING AND ADJUSTING MEANS
Filed March 24, 1952   5 Sheets-Sheet 4

INVENTOR.
Harry Harp
BY Greek Wells
Atty.

July 10, 1956

H. HARP 2,753,675

COMBINE HAVING SIDE HILL PLATFORM
MOUNTING AND ADJUSTING MEANS

Filed March 24, 1952

INVENTOR.
Harry Harp
BY
Greek Wells
Atty.

United States Patent Office 2,753,675
Patented July 10, 1956

2,753,675

COMBINE HAVING SIDE HILL PLATFORM MOUNTING AND ADJUSTING MEANS

Harry Harp, Farmington, Wash., assignor to Massey-Harris-Ferguson Inc., a corporation of Maryland Application March 24, 1952, Serial No. 278,231

22 Claims. (Cl. 56—209)

My invention relates to improvements in a combine having side hill platform mounting and adjusting means.

The particular solution of which my invention is directed is that of maintaining the header portion of the harvester substantially parallel to the ground over which the harvester is traveling, while the thresher portion is maintained in a horizontal plane. In harvesting crops on hilly ground, the slopes encountered in this area are quite steep. It is particularly necessary in using self propelled harvesters to have some means by which the header is caused to follow the slope as indicated by the wheels adjacent to the header, when the wheels are adjusted with respect to the thresher, to keep it from tipping. There are many well known devices now in use by which the wheels that support the thresher may be moved up and down with the rest of the thresher frame for the purpose of maintaining the thresher frame substantially horizontal in a direction transverse to the direction of travel. My invention will be illustrated and described in connection with one of the well known mechanisms for this purpose. It will be evident that the invention may be used with other similar mechanisms equally as well.

It is the purpose of my invention to provide a novel means, to cause the header portion of a harvester to follow the level of the wheels as they rise and fall with respect to the thresher frame, to keep it level, the means comprising a header tilting mechanism and a pivotal connection between the header and the header spout, and connections from the tilting mechanism to one of the wheel raising and lowering means, operable to turn the header on the spout in response to movement of the wheel up or down with respect to the header frame.

The nature and advantages of my invention will appear more fully from the following description and the accompanying drawings wherein a preferred form of the invention is illustrated. It should be understood however, that the drawings and description are illustrative only and are not intended to limit the invention except insofar as it is limited by the claims.

In the drawings:

Figure 2 is a fragmentary sectional view on the line 2—2 of Figure 1, illustrating the level position of the header;

Figure 3 is a view like Figure 2, showing the header in a tilted position to follow a hillside;

Figure 1:
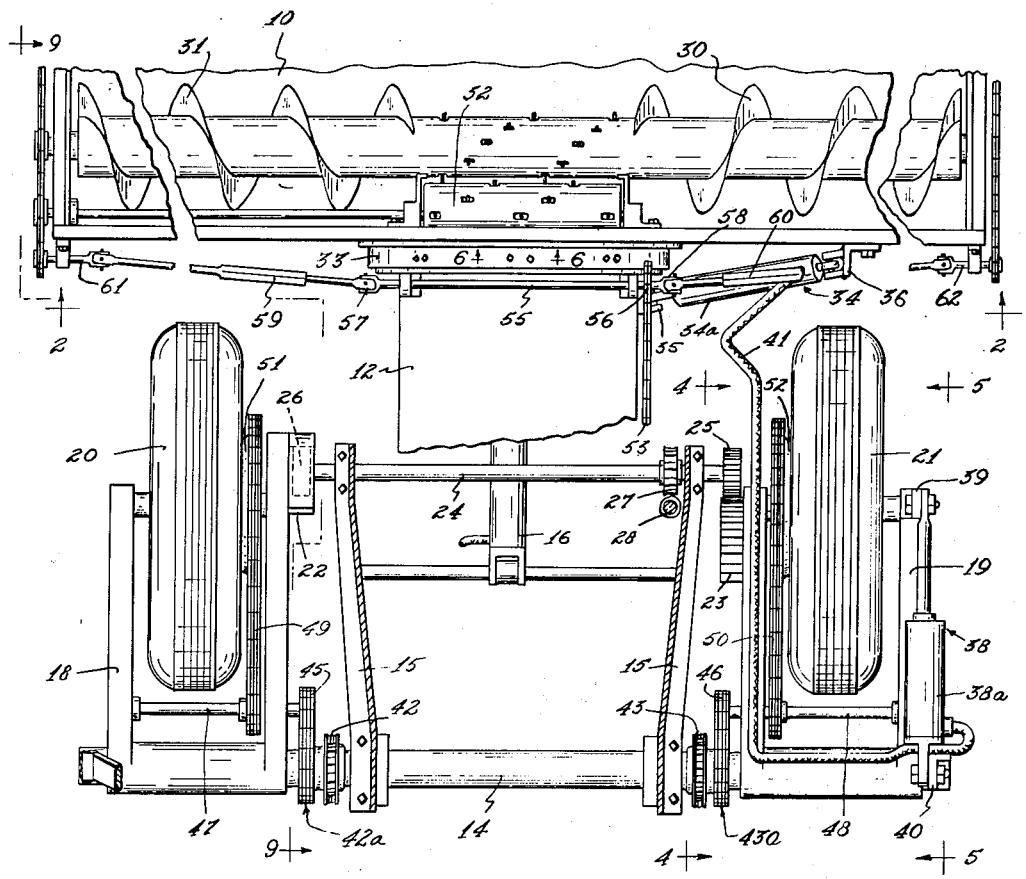
Figure 1 is a plan sectional view through the front end of a harvester showing the main front axle, the supporting wheels, a portion of the header and the control mechanism for the header and the wheels.
Figure 5:
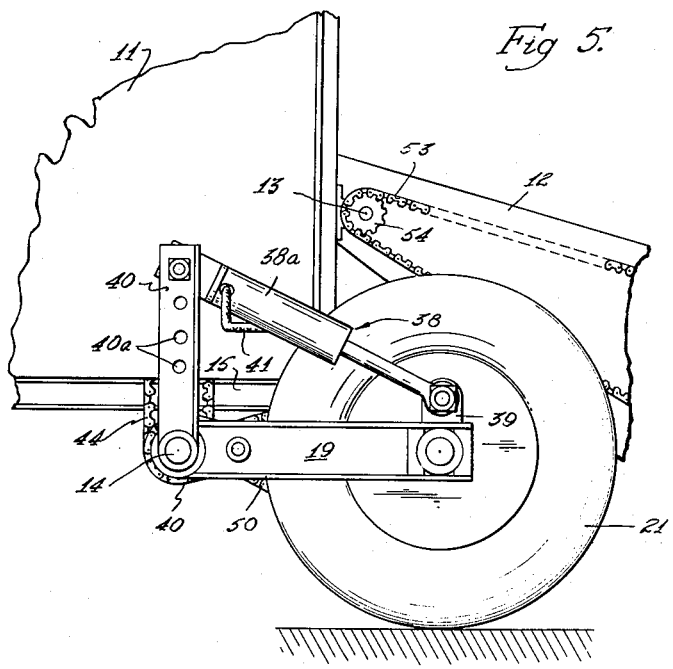
Figure 5 is a side view looking at Figure 1 in the direction indicated by the line 5—5 on Figure 1.
Figure 9:
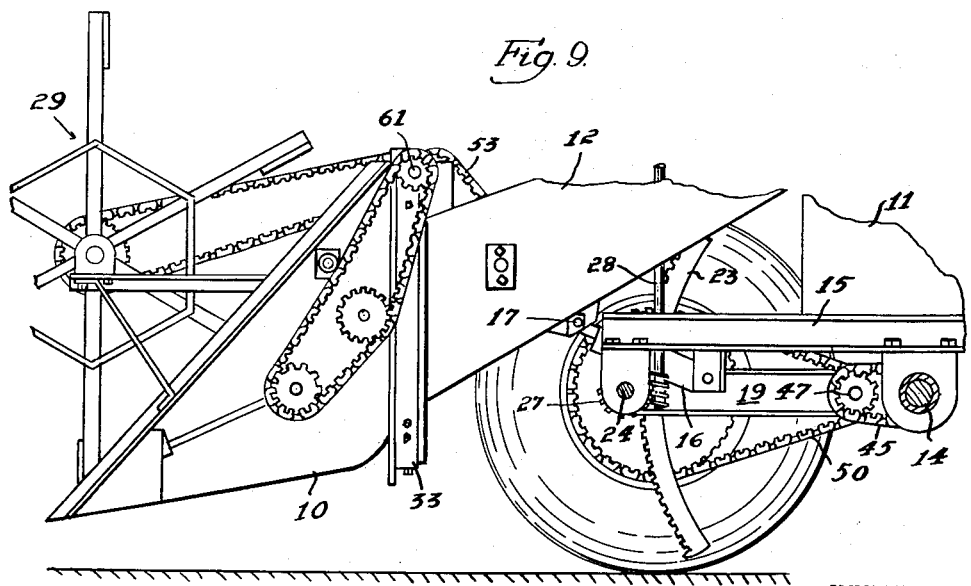
Figure 9 is a view taken on the line 9—9 of Figure 1.

Referring now to the drawings and in particular to Figures 1, 5 and 9, my invention is shown as applied to a combine harvester which has a header portion 10, commonly referred to as a harvester platform, and a body or thresher portion 11 with a feeder house or header spout 12 leading from the header portion to the thresher portion, the spout being pivoted at its rear end 13 to the thresher portion 11 so that it may swing up and down. The spout and the header portion have registering openings. The front end of the thresher portion 11 is supported by a front axle 14 and the header portion is supported by an auxiliary framework 15 which extends forward from the thresher portion 11 and has an hydraulic jack 16 which extends forwardly and is connected to the header spout at 17. The front axle 14 is supported by two wheel arms 18 and 19 that extend forwardly from the front axle and have wheels 20 and 21 at their forward ends. The auxiliary frame 15 and the wheel arms 18 and 19 have cooperating means to raise and lower the front ends of the wheel arms with respect to the axle 14. This means comprises two arcuate segmental racks 22 and 23, the rack 22 is on the arm 18, and the rack 23 is on the arm 19. The teeth on the rack 22 are on the inside, the teeth on the rack 23 are on the outside. The auxiliary frame 15 mounts a shaft 24 which has a gear 25 meshing with the rack 23 and a gear 26 meshing with the rack 22. The shaft 24 is rotated by a worm gear 27 and a worm shaft 28.

The mechanism thus far described is well known in the art. The particular header mechanism illustrated is also well known. It includes a reel 29, gathering screws or crop delivery means 30 and 31 and the usual sickle bar (not shown) with a central retractible finger feeding device 32 that feeds the cut crop to the entrance of the header spout 12.

My invention comprises a swivel joint means indicated generally by the numeral 33 journalling the mid portion of the header portion 10 on the front end of the spout 12, an expansible link 34, having one end connected to a bracket 35 on the header spout and having the other end connected to a bracket 36 on the header together with a spring 37 connecting the brackets 35 and 36 and opposing expansion of the link 34. My invention also comprises an expansible link 38 having one end connected to a bracket 39 on the free end of the arm 19 and having its other end connected to a bracket 40 which projects upwardly from, and is fixed to the axle 14. In the present instance the expansible links 34 and 38 comprise hydraulic jacks which are connected together by a fluid conduit 41 in such a fashion as to provide a power transmission means so that, as the wheel 21 is raised and shortens the link 38, the hydraulic fluid is transmitted from the cylinder 38a of the link 38 to the cylinder 34a of the link 34, thus causing an expansion of the link 34 to raise the side of the header in front of the wheel 21. If the wheel 21 is lowered with respect to the axle 14, then the hydraulic fluid is drawn into the cylinder 38a from the cylinder 34a and the spring 37 contracts the link 34 to lower the corresponding side of the header.

Figure 4:
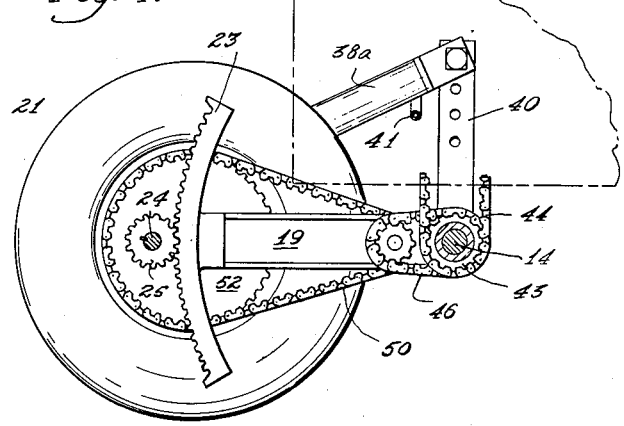
Figure 4 is a fragmentary sectional view taken on the line 4—4 of Figure 1.

The particular driving mechanism illustrated for the wheels 20 and 21 comprise drive members 42 and 43 which are journalled on the axle 14 and driven from the power source of the harvester (not shown) by means of drive chains or link belts such as that indicated at 44 in Figures 4 and 5. The drive members 42 and 43 include sprockets 42a and 43a which drive chains 45 and 46. The chains 45 and 46 are operably connected to auxiliary shafts 47 and 48 which are journalled in the arms 18 and 19. The shafts 47 and 48 drive chains 49 and 50 which in turn drive the wheels 20 and 21 by means of gears 51 and 52. It is evident of course that any other suitable drive connection may be made to the wheels 20 and 21 for advancing the harvester over the field.

The header drive mechanism is by means of a drive chain 53 that is driven by a sprocket wheel 54 on the shaft 13 that serves as a pivot for the spout 12. At the front end of the spout 12 a cross shaft 55 is mounted and this shaft has a sprocket wheel 56 driven by the chain 53. The shaft 55 has universal joints 57 and 58 at the ends thereof connected to telescoping shafts 59 and 60 which lead to shafts 61 and 62 at the ends of the header. The shafts 61 and 62 are suitably connected to the reel, the sickle and the gathering screw mechanisms of the header itself.

Figure 6:
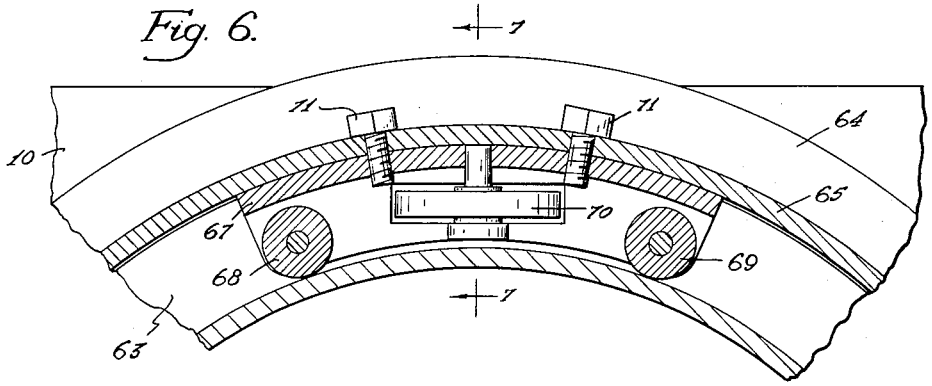
Figure 6 is an enlarged fragmentary sectional view taken on the line 6—6 of Figure 1.
Figure 7:
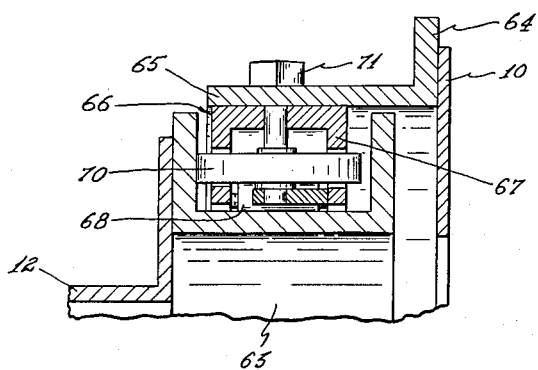
Figure 7 is a sectional view taken on the line 7—7 of Figure 6.
Figure 8:
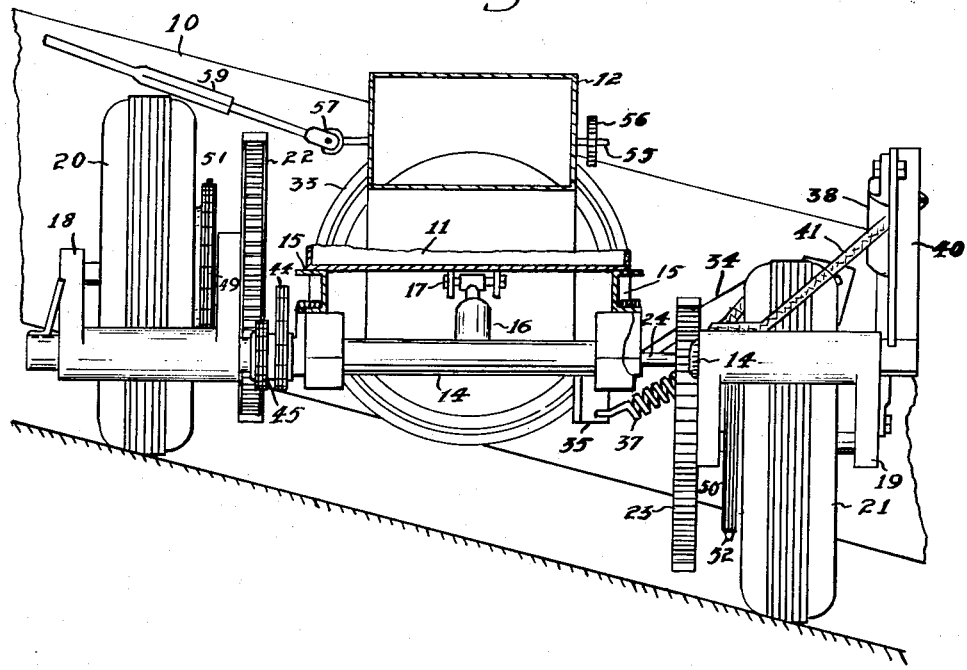
Figure 8 is a fragmentary vertical rear view of the wheel mounting and header asembly.

The means 33 by which the header is journalled on the front end of the spout 12 is illustrated in detail in Figures 6 and 7. This means comprises a circular member channel ring or track means or support element 63 which is secured to the front end of the header spout with the channel facing outwardly. A mounting or flanged ring or support element 64 is fixed to the header and has its cylindrical flange 65 encircling the channel 63. A plurality of bearing means in the form of roller units 66 are bolted to the flange 65 around the channel 63. The roller units 66 are curved channel shaped frames 67, having first low friction members or rollers 68 and 69 at the ends for riding on the base of the channel ring 63. The units 66 also mount a second low friction member or roller 70 which projects through the side flanges of the frame 67 to engage the side flanges of the ring 63. The diameter of the roller 70 is slightly less than the distance between the side flanges of the ring 63, in order to prevent binding of the rollers 70, but to enable them to take the end thrust of the header against the header spout. In order to separate the header from the header spout, it is only necessary to remove the bolts 71 that hold the units 66 in place. The ring 64 can then be separated from the ring 63 and the bracket 36 can be disconnected from the header.

The operation of the means to cause the header 10 to follow the slope of the ground as indicated by the wheels 20 and 21 is automatic in response to the adjustment of the wheels 20 and 21 to keep the thresher 11 and the axle 14 level. The cylinders 34a and 38a are so related in size that they will cause the header 10 to turn on the front end of the spout 12 to the same angle that a line through the axes of the wheels 20 and 21 makes with respect to the axle 14. The cylinder 38a can be adjusted up and down on the bracket 40 using the apertures 40a, shown in Figure 5, to correct the movement of the header 10 in response to the movement of the wheel arm 19 in the event that the cylinders 38a and 34a do not quite make the header turn the right amount.

The present invention keeps the spout 12 vertical and aligned with the thresher 11 at all times. The crop is moved into the thresher 11 after travelling up the spout. Any uneven feeding into the lower end of the spout due to the tilting of the header 10 can be evened out in the spout.

It is believed that the nature and advantages of my invention will be apparent from the foregoing description. Having thus described my invention, I claim:

1. In a combine harvester, a mobile supporting frame, a header spout pivotally mounted on said frame about a generally transverse axis and extending forwardly therefrom, a header pivoted on a forward portion of said spout, means on the frame for moving the header spout up and down with respect to the supporting frame, two transversely spaced wheels supporting the frame, means to move one of the wheels up or down with respect to the frame for leveling the frame, and means operably connected to the header and to the spout and movable in response to the up and down movement of said wheel, to turn the header about its pivot on the spout to maintain said header substantially transversely parallel to the terrain over which it moves.

2. In a combine harvester, means to cause the header to follow the level of the wheels while the thresher is kept upright, comprising a thresher, a supporting frame for the thresher, wheel arms pivotally mounted to said frame to swing up and down, wheels attached to and supporting the said arms, means on the frame operably connected to the arms to lower one arm and raise the other about their pivots for leveling the thresher supporting frame in a generally transverse direction, a header spout pivoted on the front end of the thresher about a generally transverse axis and extending forwardly therefrom, a header rotatably mounted on the front end of said spout about a generally longitudinal axis, and means to turn the header on the spout, said means comprising an extensible link having one end secured to the spout and the other end secured to the header at a different level, and means operable upon movement of one of said arms, to change the length of said link means and thereby turn the header on the spout.

3. In a combine harvester, having a thresher, a header spaced in front of the thresher and a spout leading from the middle of the header rearwardly into the thresher, means to cause the header to follow the slope of the ground while the thresher is kept level comprising pivot means mounting the rear end of the spout on the thresher about a generally transverse axis for movement up and down, and means pivotally mounting the header on the spout to turn in a plane transverse to the spout, ground engaging members supporting the thresher, means connecting the members and the thresher operable to tilt the thresher on said ground engaging members for leveling it in a generally transverse direction, and means connected to the header and to the spout and actuated by the tilting of the thresher on said members, operable to turn the header on the spout to maintain said header substantially transversely parallel to the terrain over which it moves.

4. In a combine harvester, a mobile supporting frame, a header spout pivotally mounted on said frame about a generally transverse axis, a header journalled on the front end of the spout for pivoting about a generally longitudinal axis, means on the frame to move the spout up and down, and means to turn the header on the spout, said last named means comprising a ground engaging support attached to said frame and vertically adjustable with respect to the frame, an extensible link connecting the header and the spout for turning the header on the spout, another extensible link connecting the ground engaging support and said frame and means connecting said extensible links operable to lengthen the first named link when the other link is shortened.

5. In a hillside type harvester including a header portion, a thresher portion spaced rearwardly from and directly behind the header portion and a conveyor header spout having its rear end opening into the thresher portion and its front end opening onto said header portion substantially centrally thereof, two supporting wheels for the header portion and the front end of said thresher portion, said wheels being positioned on opposite sides of the header spout immediately behind the header portion, and means connecting the wheels to the thresher portion including mechanism for raising one wheel and lowering the other wheel with respect to the thresher portion whereby to level the thresher portion in a substantially transverse direction when the harvester is on a hillside, the improvement comprising: a header portion supporting means around the front end opening of the header spout mounting and supporting the header portion for turning movement about a substantially longitudinal axis on the front end of the header spout to raise one end of the header portion and lower the other end and to accommodate the header portion to changes in the slope of a hillside along which the harvester must travel, means connecting the header spout and said header portion for causing said turning movement of the header portion on the header spout, and power transmission means operably connected between said last named means and the mechanism for raising one wheel and lowering the other, whereby to cause the header portion to turn on the header spout in response to the thresher portion leveling movement of said mechanism.

6. The invention defined in claim 5 in which the supporting means around the front end opening of the header spout comprises a ring around the front end of the spout and fixed thereto, a ring fixed to the header portion and overlapping the first named ring and rollers interposed between said rings.

7. The invention defined in claim 5 in which the means connecting the header spout and said header portion for causing said turning movement comprises an extensible link, having one end secured to the header spout adjacent the header portion and extending upwardly and away from the spout, the other end of said link being secured to the header portion at a point spaced laterally from the header spout.

8. The invention defined in claim 5 in which the supporting means around the front end opening of the header spout comprises two rings, one ring being fixed to the header spout and the other ring being fixed to the header portion, the inner ring having an outwardly facing channel and the other ring carrying rollers that roll on the bottom of the channel and rollers that roll on the sides of the channel.

9. The invention defined in claim 5 in which the means connecting the header spout and the header portion for causing turning movement of the header portion on the header spout comprises a hydraulic jack and a spring tending to shorten the jack, and the power transmission means comprises a hydraulic jack connected between one of said wheels and the thresher portion and a hydraulic fluid connection between said jacks.

10. A combine harvester comprising a mobile supporting frame, having supporting wheels vertically movably connected thereto for maintaining said frame transversely level regardless of the slope of the supporting terrain, a delivery spout pivotally attached to said harvester frame about a generally transverse axis and extending outwardly therefrom, and a header pivotally supported by a forward portion of said spout about a generally longitudinal axis, means operatively interconnecting at least one of said wheels and said header to maintain said header substantially transversely parallel to the terrain.

11. A device as defined in claim 10 further characterized in that there are cooperating members on the spout and the header pivotally mounting the header on the spout, said members comprising a ring around the front end of the spout, a ring fixed to the header and overlapping the first named ring, one of said rings having a channel facing the other ring and rollers mounted on the other ring and extending into said channel.

12. A combine harvester comprising a mobile supporting frame, having supporting wheels at least one of which is vertically movably connected thereto for maintaining said frame transversely level regardless of the slope of the supporting terrain, a delivery spout pivotally attached to said harvester frame about a generally transverse axis and extending outwardly therefrom, and a header pivotally supported by a forward portion of said spout about a generally longitudinal axis, means operatively interconnecting said vertically movable wheel and said header to maintain said header substantially transversely parallel to the terrain.

13. A combine harvester comprising a mobile supporting frame, having wheel arms vertically movably connected thereto for maintaining said frame transversely level regardless of the slope of the supporting terrain, a ground engaging wheel attached to each of said arms, a delivery spout pivotally attached to said harvester frame about a generally transverse axis and extending outwardly therefrom, and a header pivotally supported by a forward portion of said spout about a generally longitudinal axis, means operatively interconnecting at least one of said wheel arms and said header to maintain said header substantially transversely parallel to the terrain.

14. In a hillside-type harvester including a body having a feeder house element formed with a forwardly facing feed opening and a harvester platform element ahead of the feeder house and having a rearwardly facing opening in register with the feeder house opening, the improvement comprising; a swivel joint interconnecting the feeder house and platform elements for relative angular movement about a fore-and-aft axis through the registering openings, including a circular member fixed to one element and surrounding the registering openings, and bearing means fixed to the other element and engaging peripheral portions of the circular member.

15. In a combine having a body including a forwardly projecting feeder house provided with an upright front mounting face having a forwardly facing feed opening and a harvester platform ahead of the feeder house and including an upright back wall provided with a rear mounting face formed with a rearwardly facing feed opening in register with the feeder house opening, the improvement residing in means for articulately interconnecting the feeder house and the platform via the mounting faces, comprising: a ring member fixed to one mounting face and circumscribing the feed opening therein; and bearing means fixed to the other mounting face and lying on a circle circumscribing the feed opening therein and engaging peripheral portions of the ring.

16. For a combine of the character described: a harvester platform having an upright rear mounting face formed with a feed opening therethrough; and a mounting ring circumscribing the opening and affixed to the mounting face.

17. The invention defined in claim 14 in which: the circular member has its periphery formed as an annular channel-like track, and the bearing means includes low-friction members riding in said track.

18. The invention defined in claim 14 in which: the circular member has its periphery formed with an upright annular flange and an adjoining horizontal annular flange, and the bearing means includes first and second low-friction members respectively engaging the flanges.

19. In a hillside-type harvester including a body having a feeder house element formed with a forwardly facing feed opening and a harvester platform element ahead of the feeder house and having a rearwardly facing opening in register with the feeder house opening, the improvement comprising: a swivel joint interconnecting the feeder house and platform elements for relative angular movement about a fore-and-aft axis through the registering openings, including arcuate track means fixed to one element and lying on a circle surrounding the registering openings and concentric with the fore-and-aft axis and bearing means fixed to the other element and engaging the arcuate track means.

20. In a hillside combine including a thresher unit adapted to operate in a level position on a hillside and having a longitudinally extending feeder house provided with portions defining a forwardly facing crop-inlet opening, and a harvester unit adjacent to the thresher unit and adapted to operate parallel to the slope of the side hill and having crop-delivery means including portions adjacent to the feeder house portions and defining a rearwardly facing crop-outlet opening, in register with the crop-inlet opening, the improvement residing in means for articulately interconnecting the harvester unit and the feeder house to accommodate differences in angularity therebetween according to different side hill slopes, comprising: first and second support elements interjournaled for relative angular movement and positioned at the junction of the feeder house and harvester unit portions in juxtaposition to the registering openings with the journaling axis extending longitudinally through said openings and within the confines of the opening-defining portions; first and second means respectively on the support elements for affixing the elements respectively to the feeder house and to the harvester unit so that the aforesaid articulation between the feeder house and the harvester unit occurs about the journaling axis to retain registry of the openings; and said support elements being so shaped and dimensioned relative to each other and to the openings as to be traversed by crops moving from the harvester unit to the feeder house via the registered openings.

21. A harvester platform for mounting on the front of the feeder house of a combine and having a rear mounting face formed with a feed opening therein adapted to register with the front feed opening in the feeder house; and feeder-house-engaging journal means fixed to the platform mounting face and lying on a circle circumscribing the feed opening in said face.

22. The invention defined in claim 15, in which: the ring is of channel section having an annular horizontal flange and a pair of annular upright flanges; and the bearing means includes rolling elements on horizontal axes for riding on the horizontal flange and additional rolling elements on vertical axes, each of the additional rolling elements having a diameter less than the distance between the upright flanges so as to engage and ride on only one or the other of said upright flanges depending upon the direction of longitudinal thrust on the platform.

References Cited in the file of this patent
UNITED STATES PATENTS

| | | |
|---|---|---|
| 1,886,069 | Wandscheer | Nov. 1, 1932 |
| 2,076,523 | Ballack et al. | Apr. 13, 1937 |
| 2,488,592 | Hamilton et al. | Nov. 22, 1949 |
| 2,504,289 | Waterman | Apr. 18, 1950 |
| 2,513,111 | Schiller | June 27, 1950 |
| 2,654,207 | Long | Oct. 6, 1953 |
| 2,656,668 | Witzel | Oct. 27, 1953 |